Aug. 8, 1950     H. JENETT     2,518,423

METHOD OF PACKAGING

Filed Oct. 4, 1945

INVENTOR
HENRY JENETT.

BY *Wm. F. Kelly*

ATTORNEY

Patented Aug. 8, 1950

2,518,423

UNITED STATES PATENT OFFICE 2,518,423

METHOD OF PACKAGING

Henry Jenett, Upper Montclair, N. J.; Caroline Louise Maria Jenett executrix of said Henry Jenett, deceased Application October 4, 1945, Serial No. 620,412

1 Claim. (Cl. 18—59.)

The present invention relates to a method of forming a strippable protective coating for articles and may be said to constitute one specific application of the stripcoating compositions prepared by the method as shown and described in my copending application Serial No. 628,381, filed November 13, 1945, now abandoned and assigned to the same assignee as the present invention.

In this above mentioned copending application I have disclosed stripcoating compositions and methods of their preparation which coatings may be applied to various articles by means of dipping, spreading, flow-coating, spraying, or other well known coating methods. Moreover, the stripcoating compositions as therein described are in no way limited by the size or nature of the article to be coated, nor by the degree of mechanization employed in the coating procedure. Obviously, however, certain types of articles may be more advantageously coated by a particular method than others and it is with the latter that the present invention is concerned.

For example, objects having very small or irregular dimensions, such as small screws, cones, or nozzles, or those extremely thin or wafer-like in shape, such as razor-blades, or of such delicate construction that the attachment or removal of dowels, pins, clamps, loops or other devices would injure or distort them, such as fine springs, spirals and relay coils, or articles calling for extreme precautions, such as sterile handling, absence of fingerprints, lint, or other impurities, as small surgical instruments, optical lenses, delicate gauges and the like, can be more efficiently and economically coated preferably by a continuous coating method. Prior to the present invention it has been the customary practice to enshroud such small, sensitive, or difficult-to-wrap articles in a thermoplastic foil, or to place such articles in envelopes fashioned from such foil and subsequently heat-seal the envelopes. For purposes of economy, such packages usually contain a plurality of a given article, thus involving the danger of mechanical damage in transit or storage, as well as the articles being subjected to contamination or corrosion when the package is opened to remove only one or more of such articles therefrom.

A method has been recently suggested for avoiding some of the above noted disadvantages by individually packing articles, like vitamin pills and medicinal tablets, as well as prepared meat products, which consists in employing two preformed sheets of thermoplastic material and suitably heat-sealing after the articles have been properly placed between the sheets. This accordingly forms individual pockets for each article since the sealing is effected either by impinging upon the foil with a grid-like hot die, or by fusing with a hot-air blow-torch in a pattern forming the seams of the individual pocket encasing each article.

Although this latter method may be suited to flat articles, such as tablets, wafers, or those consisting of a yielding mass, such for instance as ground beef or the like, which articles will adapt themselves to the shallow form of the pockets, it is subject to several disadvantages when employed in connection with other types of articles. This becomes apparent when it is appreciated that the distensibility of a preformed thermoplastic sheet or foil is limited and consequently the individual pockets must be relatively large in order to allow for a minimum of distoration of the plastic coating due to the irregular shape of the encased article. The unnecessarily large size of the pocket results in not only a waste of space and wrapping material, but more significantly there is an occlusion of a large volume of air surrounding the article which too frequently results in harmful effects due to oxidation, usually hastened by precipitation of the moisture contained in the occluded air.

In addition to the foregoing a further disadvantage is that mechanical protection of the article is impaired because the latter is not tightly encased with the result that delicate shapes may suffer distortion, sharp edges may be nicked or dulled, compressed pulverulent materials may crumble at the edges and hollow articles may be dented more readily because they can shift around and knock or rub against each other even though individually protected from each other by a loose-fitting pocket which does not offer a sufficiently rigid protection between the articles.

A still further disadvantage of enclosing articles in individual pockets, formed by heatsealing two layers of thermoplastic material, resides in the fact that heatsealing thin foil is a delicate and difficult-to-control operation, often resulting in a high percentage of imperfect or absolutely faulty closures, since too much heat fuses the foils causing contraction and breaks, especially where the foil is drawn tautly over an edge of the article, while insufficient heat may cause the foils to part even under the strain of ordinary handling. Also, in many instances, the application of heat in such close proximity to the article being encased has a deleterious effect on the latter.

It is accordingly the primary object of the present invention to provide a method of stripcoating individual articles by forming the coating and embedding or completely encasing the articles therein without the necessity of subsequent sealing.

Another object of the present invention is the provision of a method of applying a plastic protective coating to articles of any particular shape and wherein each individual article is completely embedded in the coating to thus form a substantially air-free pocket having a dimension and shape conforming precisely to that of the article therein.

Another object of the present invention is to provide a method for applying a plastic protective coating to articles to prevent the atmosphere from deleteriously affecting the articles and wherein the coating is formed and the articles deposited thereon and completely embedded therein in one operation.

Another object of the present invention is the provision of a method for applying a plastic protective coating to manufactured articles wherein the articles are placed on a strip or sheet of preformed plastic material and after depositing the articles thereon, the latter are then coated by spraying or flowing a layer of the same plastic material, or a material of similar characteristics, with a solvent therein which forms a seal with the supporting sheet or strip without requiring the application of heat thereto.

Still further objects of the present invention will become obvious to those skilled in the art by reference to the accompanying drawing wherein.

Figure 1:
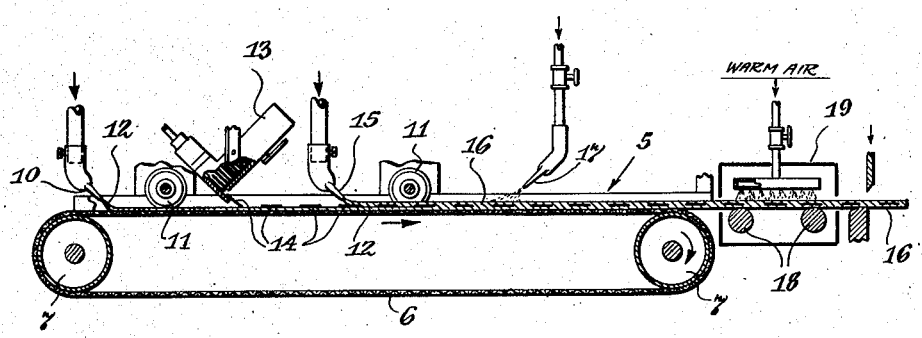
Figure 1 is a side view of one form of apparatus which may be employed to perform the method of the present invention.
Figure 2:
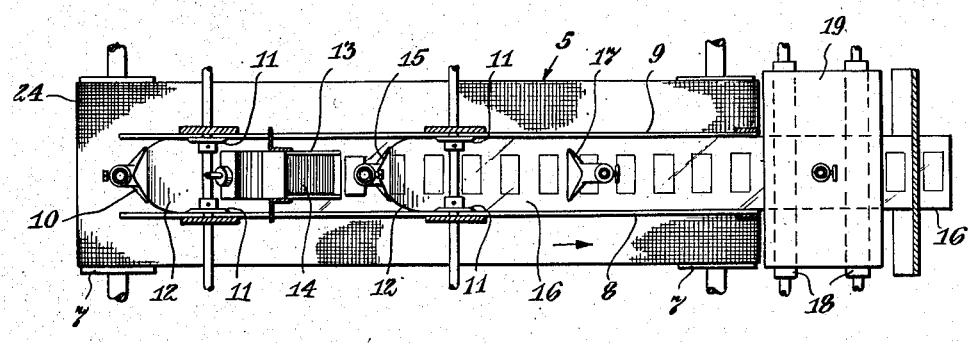
Figure 2 is a top plan view of the apparatus as shown in Figure 1.

Referring now to the drawings in detail a work table 5 is therein shown comprising an endless conveyor 6 passing around rollers 7 disposed at each end of the conveyor and one of which is suitably rotated by a power drive such as an electric motor or the like (not shown). As will be noted, a pair of guide bars 8 and 9, adjustably spaced relative to each other, are suitably supported by the work table 5, yet allow free movement of the conveyor 6 and thus constitute a "form" for preselecting the width of the plastic strip, as hereinafter described.

An outlet nozzle 10, the width and height of the opening of which are adjustable in any suitable manner and which connects with a suitable reservoir of plastic material (not shown) of predetermined viscosity is positioned adjacent the feed-end of the conveyor 6 and when opened ejects or extrudes the material 12 on to the top of the conveyor 6 between the guide bars 8 and 9.

Due to the peculiar characteristics of the stripcoating composition, several types of which are fully described in my above mentioned copending application Serial No. 628,381, now abandoned, the liquid film which is fed continuously from the nozzle 10 begins to congeal on the conveyor 6, gradually forming a band of slightly tacky but coherent gel-like plastic. At a predetermined point suitably adjustable means, such as tapered scrapers, thin blades, or rotating disc knives 11, the strip the congealing ribbon from the stationary guide bars 8 and 9, permitting it to travel freely along with the moving conveyor.

The material 12, in the form of a fully gelled ribbon, in moving along with the conveyor 6, passes beneath a receptable in the form of a hopper 13 containing the articles 14 to be coated, such for example as razor blades, metallic machined articles of irregular shape, vitamin pills, or the like, which are intermittently deposited thereon from the receptacle in any well known manner so as to be in spaced relation, while the plastic material 12 is still in a slightly tacky state. Beyond this receptacle is positioned a second nozzle 15 which preferably is connected to the same reservoir as the nozzle 10, although a second reservoir may be employed, if desired, and from which nozzle 15 the same plastic composition 12, or one having similar characteristics, is ejected or extruded, covering articles 14 and uniting with the lower layer of material 12, to completely and tightly encase the articles in individual substantially air-free strippable pockets.

While the composite strip 16 travels in the direction of the forward roller 7, it meets a blast of hot air from a nozzle 17 which removes most of the solvent contained in the gel-like ribbon, so that by the time the end of the conveyor is reached the ribbon is resilient and tough enough to continue further under tension and over guiding rollers 18, through a heating tunnel 19 fed with warm arm, in which the last traces of solvent are removed. Where the articles embedded are light enough to permit the ribbon to be carried on a stream of hot air, the guiding rollers 18 may be omitted.

Although the conveyor 6 may be formed of metal, leather, fabric, or the like, it is particularly advantageous to form the same of wire mesh or perforated material 24 because not only is removal of the solvent from the gelled ribbon 16 hastened by exposure of the lower stratum of gelled plastic to the hot air current but in addition such wire mesh or perforated conveyor 24 leaves a scored pattern 25 on the back of the finished ribbon 16, which gives much desired pliability. This characteristic structure, which is practical only because of the peculiar surface tension and cohesiveness of the gels employed, is of particular importance in yielding a ribbon which strips readily from wire mesh or a perforated conveyor.

Figure 3:
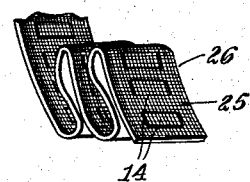
Figure 3 is a prospective view of a completely packaged article having an integral strippable protective coating in accordance with the present invention.

It will also be appreciated by reference to Fig. 3 that the completely packaged articles 26, such as the razor blades shown, may be readily folded upon themselves for storing or shipping in quantities. This is due not only to the desired distensibility of the coating material because of its inherent properties, but the scored surface 25 of the plastic coated package greatly aids the pliability of the coating. Accordingly, the completely packaged article 26 can be freely folded without fear of breaking or shearing. It will also retain its folded position without a springy tension tending to cause straightening. In addition the scored surface aids in tearing off individual articles and the stripping of the coating from the latter.

Figure 4:
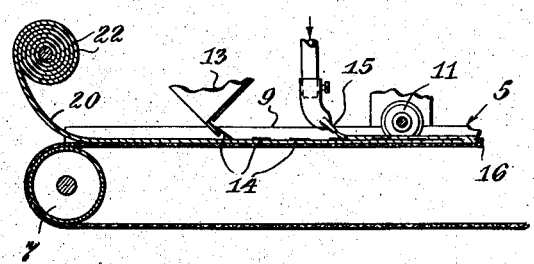
Figure 4 is a fragmentary view similar to Fig. 1 and showing a modification which the present invention may take.

In Figure 4, a modification of the present invention has been shown which differs from that previously described in that the initial layer of the plastic material 20 is preformed in strip form and disposed upon a suitable spool 22. Again, however, the preformed strip is shown as following the conveyor 6 in the direction of its movement from left to right, as shown in the drawings, between the guide bars 8 and 9. However, it is not essential that the work table 5 in this instance be a movable conveyor but instead the preformed strip 20 may be drawn across the table top beneath a retaining roller or the like, to hold the strip on the surface of the work table during its movement.

The strip passes beneath the receptacle 13 where the articles 14 are deposited in the same manner as above noted. It then passes under the nozzle 15 where the same plastic material 12, or a material having similar characteristics, as that of the preformed strip 20, is sprayed or extruded thereon. The solvent action of the hot til coming from nozzle 15 and encasing the argiles 14 is sufficient to bond this liquid layer permanently and inseparably to the preformed strip 1. Again the characteristic surface tension phenomena of the gel from the nozzle 15 prevents the solvent portion of it to penetrate too deeply into the preformed plastic strip 20, so that it will neither distort, warp nor part under tension as would be the case if active solvent alone or a solution possessing good wetting properties were used.

Although in both modifications the work table is shown as being provided with the guide bars 8 and 9, it is to be understood that they may be dispensed with, if desired, and the plastic material allowed to flow freely on to the conveyor 6. This, however, would necessitate a subsequent trimming in order to make the finished strip with the embedded articles of uniform width. The latter is highly desirable in instances where the articles, such as razor blades, or vitamin pills, so embedded in the protective coating, are to be marked through dispensing machines which cut the strip to dispense a pre-selected number of articles, depending upon the denomination of the coin inserted in the machine.

In selecting materials 12 for use in the practice of the present invention, the bottom layer may be of any plastic substance which can be made cohesive by solvent. At the point of application of the objects to be coated, it must be sufficiently congealed to support the weight of the article. The material for the layer, however, must be very carefully selected. It must be either identical or sufficiently close in characteristics to the bottom layer to knit with it and produce a homogeneous bond. It must contain solvent which, at the temperature of application, softens the bottom layer. However, the material must lose these solvent characteristics rapidly, so as not to destroy the film. Consequently, I prefer to use a gel of the type described in my copending application Serial No. 628,381. As an example of two different materials which yield a homogeneous package there can be used a preformed film made of polyvinyl chloride or copolymerized polyvinyl chloride, suitably plasticized or otherwise modified, and a solution of polyvinylidene chloride and cyclohexanone, or vice versa, mentioned in my above noted copending application, Serial No. 628,381, filed November 13, 1945.

The compositions, as mentioned in my above noted copending application, are originally formed by heating the ingredients to a temperature sufficient to reduce them to a homogeneous, free-flowing, solution of constant viscosity for a given solids content. Such solutions, when maintained at the proper temperature, will flow by gravity or under moderate pressure from the reservoir, depending upon their viscosity and changing through a mobile, tacky state into a gelled, fairly resilient web, having a thickness determinable by its original rate of flow from the reservoir. Upon complete evaporation of the solvent, the film, when properly plasticized, will conform with the shape of the article it has been cast around, without adhering to it, yet leaving no space for air-pockets in which moisture could be trapped.

It thus becomes obvious to those skilled in the art that a plastic coating for various articles is herein provided which readily forms an air-tight seal for such articles without the necessity of heating by a die or otherwise to form a seal. The entire coating may be formed about the articles at one time by two consecutive layers of composition in gel form, or one layer may be preformed and after deposition of the articles thereon a second gel-like layer may be applied which readily unites with the preformed layer due to the solvent of the top layer effecting a homogeneous bond between them. The articles, although shown herein as embedded in a continuous strip of plastic material, can, of course, be produced in sheet form of any selected size. Moreover, the completely packaged article is provided with a coating having a scored surface which aids pliability and stripping of the article when the latter is desired. Also, while a simple apparatus has been herein shown for embedding the articles in a protective plastic coating many other types of apparatus may be employed to accomplish the same result of coating articles in accordance with the method of the present invention.

Although several embodiments of the present invention have been shown and described, it is to be understood that still other modifications thereof may be made without departing from the spirit and scope of the appended claim.

I claim:

The method of sealing articles in a protective coating which comprises preforming a continuous layer of strippable thermoplastic material, successively depositing the articles to be coated on such preformed layer, and spraying a second gel-forming solvent-bearing layer of strippable thermoplastic material on the deposited articles and preformed layer which dissolves the latter sufficiently to form an integral unitary mass completely embedding the deposited articles in an air-free pocket and without the strip-coating adhering to the articles.

HENRY JENETT.

REFERENCES CITED

The following references are of record in the file of this patent:

UNITED STATES PATENTS

| Number | Name | Date |
| --- | --- | --- |
| 934,214 | Ratignier et al. | Sept. 14, 1909 |
| 1,204,083 | Starr | Nov. 7, 1916 |
| 1,489,379 | Zeller | Apr. 8, 1924 |
| 1,827,549 | Villain | Oct. 13, 1931 |
| 2,012,405 | Salfisberg | Aug. 27, 1935 |
| 2,020,255 | Copeman | Nov. 5, 1935 |
| 2,042,104 | Kane | May 26, 1936 |
| 2,075,178 | Copeman | Mar. 30, 1937 |
| 2,183,520 | Van Derhoef | Dec. 19, 1939 |
| 2,200,001 | Kenyon | May, 7, 1940 |
| 2,204,781 | Wattles | June 18, 1940 |
| 2,248,471 | Stroop | July 8, 1941 |
| 2,263,792 | Wood | Nov. 25, 1941 |
| 2,333,887 | Redlinger | Nov. 9, 1943 |
| 2,345,013 | Soday | Mar. 28, 1944 |
| 2,379,793 | Eenigenburg | July 3, 1945 |